Nov. 11, 1958  H. H. GORRIE  2,859,618
COMPENSATOR FOR QUANTITY MEASURING METER
Filed Oct. 20, 1955

INVENTOR.
HARVARD H. GORRIE
BY Arthur L. Wade
ATTORNEY

United States Patent Office 2,859,618
Patented Nov. 11, 1958

1

2,859,618

COMPENSATOR FOR QUANTITY MEASURING METER

Harvard H. Gorrie, Cleveland Heights, Ohio, assignor to Bailey Meter Company, a corporation of Delaware Application October 20, 1955, Serial No. 541,617

5 Claims. (Cl. 73—205)

The present invention relates to the compensation of a manifestation of a quantitative measurement. The invention contemplates supplementing a mechanical motion, representative of a measured quantity of a medium at predetermined values of specific weight, with a bias motion representative of the variations in the quantity of the medium which would move past a given point due to deviations from a predetermined value of specific weight of the medium.

The embodiment of the invention illustrated is applied to the quantitative measurement of a flowing medium in a conduit. It is a common expendient to restrict the flow of fluids in a conduit by such devices as an orifice or flow nozzle which develop differentials of pressure across themselves which are proportional to the square of the rate of fluid flowing through them. Primary elements restricting the fluid flow are designed to develop differential pressures, over a specific range, which are representative of the square of the rate of fluid flow at predetermined values of specific weight of the fluid. Deviation from the design values of specific weight will vary the rate of flow without necessarily varying the differential pressures proportionately. To correct the resulting manifestation to the true quantitative value by apparatus responsive to the differential pressures, it is necessary to introduce a mechanical motion which will compensate for the deviation of the specific weight from its design value.

The present invention is embodied in a flow meter receiving the differential pressures of a primary element and developing a force to turn a spindle through an angle of rotation representative of the range of flow variations generating the differential pressures. Mounted on this spindle is a pressure responsive device subjected to one of the pressures in the meter casing, through a passage in the spindle, which will adjust the linkage transmitting spindle motion to the manifesting means in order that the motion of the manifesting means will accurately represent the quantity of fluid generating the differential pressures.

It is an object of the present invention to correct the manifestation of quantitative measurement of a medium in accordance with the variation of specific weight of the medium quantitatively measured.

It is another object of the invention to provide compensation of a quantitative measurement of a medium by a structure responsive to a variable of the medium representative of the variable specific weight and mounted directly on a member positioned by pressures representative of the quantity.

It is a further object of the invention to mechanically compensate the manifestation of a quantitative measurement with a minimum of linkage.

It is a further object of the invention to provide a compensator for quantitative measurement that can be calibrated and stocked as a shelf item.

A further object of the invention is to provide a pressure and/or temperature compensator which is inexpensive, simple and integral with the metering device responsive to a primary element developing pressures representative of the quantity of a measured medium.

2

Figure 1:
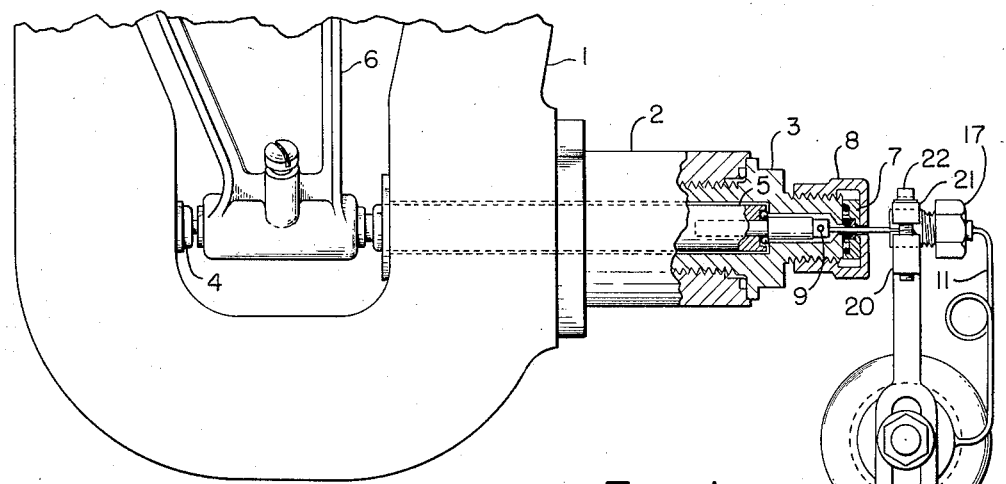
Fig. 1 is a plan view, partially sectioned, illustrating the invention as applied to a conventional flow meter.

In Fig. 1, my invention is illustrated as applied to a flow meter, a portion of which is shown in the form of casing 1, with an integral extension member 2. Into extension member 2 is threaded a support member 3. A rear bearing assembly 4 is located within meter casing 1.

Spindle 5 extends from bearing 4 through casing 1 and extension member 2 to the exterior of support member 3. The spindle is adapted to rotate through a predetermined angle, by means of the meter mechanism, through the agency of an arm, or lever, 6 attached to spindle 5. Similar arrangements are disclosed in 2,224,627; 2,042,166; and 1,977,030 while representative meter mechanism, actuating similar arm, or lever, elements is disclosed in 1,999,029. Support member 3 is provided with an opening slightly larger than the spindle to eliminate friction between them. The end of spindle 5 then protrudes through support member 3, moving in a pressure tight bearing assembly 7, while the other end of the spindle moves in bearing 4.

The bearing structure is more fully disclosed in an application SN 388,829; filed October 28, 1953; now Patent 2,757,053; by Thomas A. Green. The structure, as disclosed at 7, provides an O-ring and a back-up washer which are backed up by a metallic follower which bears against support member 3 when the retaining cap 8 is threaded on to member 3. Cap 8 is also provided with an aperture which allows the spindle 5 to pass externally without frictional contact.

In order to actuate the present invention, the pressure within casing 1 is brought out through a hollow portion of spindle 5. A hole 9 is indicated through which this pressure is transmitted through the hollow length of spindle 5. Compensating structure is mounted on the external portion of spindle 5 and the pressure within the spindle is transmitted to a pressure responsive chamber 10 forming a portion of the compensating structure mounted on the spindle. Capillary tube 11 specifically communicates the end of the hollow portion of spindle 5 to the interior of chamber 10.

Figure 2:
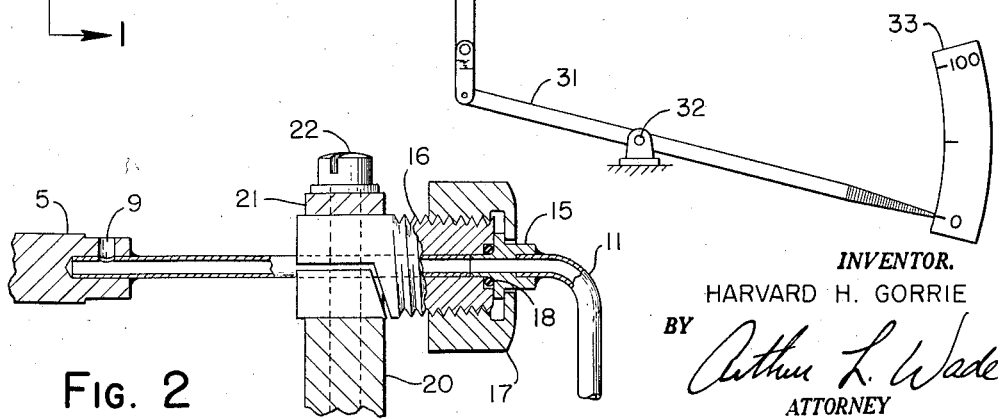
Fig. 2 is a sectioned elevation of a part of the structure of Fig. 1.

In Fig. 2 the union between the compensating structure and external end of spindle 5 is shown in a sectioned elevation. The hole 9 is clearly shown, communicating the pressure from inside casing 1 to the hollow portion of spindle 5. Capillary tube 11 communicates with the end of spindle 5, transmitting the pressure into chamber 10.

A flange plate 15 is fixed to the end of capillary 11. A mating female fitting 16 is clamped to the end of spindle 5 and is drawn into union with flange plate 15 by nut 17. A ring of gasket material 18 is used to make the union between plate 15 and fitting 16 leakproof.

To mount the compensating structure on spindle 5, bracket arm 20 is clamped to one end of female fitting 16. A length of fitting 16, to which arm 20 is clamped, is split as shown in order that yoke 21 may draw fitting 16, arm 20 and spindle 5 into an integral assembly by means of studs 22.

Figure 3:
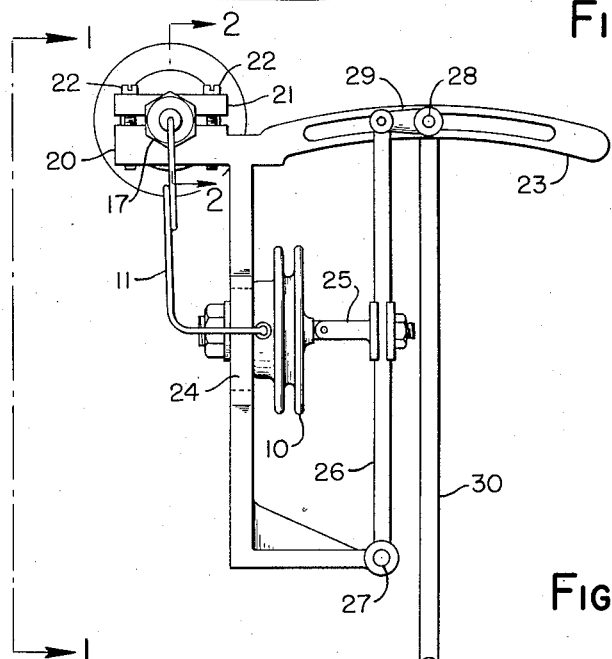
Fig. 3 is a front elevation of the structure embodying the invention as applied to the meter of Fig. 1.

Referring to Fig. 3, the structure in which the invention is embodied is seen to best advantage. In this elevation view, bracket arm 20 dominates the disclosure. In the preceding views, taken at right angles to the elevation of Fig. 3, the central nature of the arm 20 could not be fully appreciated. Clamped firmly to spindle 5, by yoke 21 and studs 22, arm 20 pivots about the center of spindle 5, cooperating the various elements of the combination in which the invention is embodied in order to carry out the function of the invention.

Bracket arm 20 has several components. Essentially the arm provides a link of variable length by shifting a pivot for actuated linkage along its slotted extension 23. Pressure responsive bellows 10 is mounted on base extension portion 24 and controls the shifting of the pivot structure in slotted extension 23.

It has been appreciated, from the disclosure of Figs. 1 and 2, that chamber 10 responds to fluid pressures coming to it through capillary tube 11. The motion of expansion and contraction of chamber 10 is transmitted through link 25 to pivoted arm 26. Pivoted arm 26 is hinged from base extension 24 at pivot 27. Therefore, chamber 10 acts directly to pivot arm 26 about its pivot 27 in accordance with its internal pressure variation. Pivoted arm 26 is attached directly to movable pivot 28 by means of link 29. Several arrangements are obviously practical for shifting pivot 28 along the arc of the slot in extension 23.

The position of pivot 28 along extension 23 determines the active length of the link formed by bracket arm 20 in actuating linkage which manifests the quantitative value of the medium to which the meter of casing 1 is responsive. Links 30 and 31 are representative of various possible arrangements of linkage which may be actuated by bracket arm 20. The disclosure of Fig. 3 gives the simple arrangement of utilizing link 31 as a pointer, pivoted at 32, to cooperate with scale 33 in order to manifest the quantitative value of the medium measured. The objects of the present invention are realized as this linkage, represented by links 30 and 31, is basically actuated from rotation of meter spindle 5 and concomitantly biased by shifting pivot 28 in the arc of extension 23 in accordance with the specific weight change of the medium measured as evidenced by pressure variations of the medium.

The necessity of having bellows 10 apply its force directly to pivoted arm 26, rather than directly to link 30, is evident if an analysis of the motion produced by rotating the extension 23 of bracket arm 20 about the spindle axis is made. The motion of bellows 10 must be independent of the rotation of the extension 23 in order that each have its separate function on the motion of link 30. Bellows 10 must position the pivot 28 of link 30 in the slot of extension 23 and the pivot 28 must be carried about the spindle axis without interaction.

If link 25 were connected to a pivot point on link 30 between pivot point 28 and the other end of link 30, a relative motion between the pivot point and link 25 would result. This result would be brought about by the lack of coincidence between the centers of rotation of link 30 and link 25. Of course, the use of link 29, with the length of link 26 being less than that of link 30, introduces a certain amount of angularity in the actuation of link 30. However, the length of lingth 26 can be adjusted with respect to that of link 30 to reduce this angularity to satisfactory limits.

Adjustments similar to that for angularity may be provided to calibrate the structure. Obviously, the shift of the position of bellows 10 along extension 24 will determine the range of compensation given link 30. The range of pressures which may be carried by bellows 10 is a matter of design of the bellows, matching it with the range of pressures anticipated from casing 1. Further, the instrumentalities actuated by linkage, represented by 30 and 31, includes recording and control devices as well as indicating mechanisms such as scale 33.

It is also to be understood that bellows 10, responsive to fluid pressures from casing 1 and compensating a manifestation of quantitative measurement, may also be the recipient of pressures representative of temperature changes in the medium quantitatively measured. The present invention contemplates the use of mechanisms mounted integrally on the moving element of a meter which will compensate the manifestation of that movement in accordance with changes in all factors affecting the specific weight of a medium measured. It is presently more common to take into account the effect of pressure and temperature deviations from those for which a primary element has been designed.

The present embodiment of the invention as disclosed, illustrates a single bellows responsive to pressure variations of a flowing fluid. However, it is possible that a second bellows, responsive to temperature variations in the fluid, could be mounted upon base extension 24 and position pivot 28 in slotted extension 23 concomitantly with bellows 10 through differential linkage. The result of this arrangement would be to give complete compensation from both pressure and temperature variations of the flowing medium through a primary element designed for specific pressure and temperature values.

What I claim as new, and desire to secure by Letters Patent of the United States, is:

1. A compensating mechanism for a meter measuring the quantity of a medium including, a casing for the meter into which the medium is introduced, a spindle of the meter rotated around its longitudinal axis through a predetermined angle for a predetermined range of quantity values of the medium at predetermined values of specific weight, a pressure responsive chamber mounted on the spindle, a conduit from the medium in the casing transmitting a pressure representative of the specific weight of the medium to the pressure responsive chamber, a drive arm mounted on the spindle with its effective length varied by the pressure responsive chamber, and manifesting structure for the medium quantity actuated by the variable length of drive arm.

2. A compensating mechanism for a meter measuring the quantity of a medium including, a casing for the meter into which the medium is introduced, a spindle of the meter rotated around its longitudinal axis through a predetermined angle for a predetermined range of quantity values of the medium at predetermined values of specific weight, a spindle portion providing a conduit subjected to a pressure representative of the specific weight of the medium in the casing, a pressure responsive chamber mounted on the spindle and responding to the specific weight, a drive arm mounted on the spindle with its effective length varied by the pressure responsive chamber, and manifesting structure for the medium quantity actuated by the variable length of drive arm.

3. The mechanism of claim 2 wherein the meter is measuring the quanity of a flow of fluid, the spindle is rotated by the meter in response to differential pressures across a restriction in the fluid flow, the spindle portion providing a conduit is a hollow portion of the spindle conducting the pressure external of the meter, and a common mounting is provided on the spindle for the pressure responsive chamber and the drive arm.

4. The mechanism of claim 3 wherein the effective length of the drive arm is varied by moving the pivot connection between it and the manifesting structure along a slot in the drive arm by connection with the pressure responsive chamber.

5. The mechanism of claim 4 wherein the connection between the pressure responsive chamber and the pivot connection is a first link pivoted from the common mounting and a second link between the pivot connection and the end of the first link which is not pivoted from the common mounting.

References Cited in the file of this patent

UNITED STATES PATENTS

| | | |
|---|---|---|
| 2,484,207 | Criner et al. | Oct. 11, 1949 |
| 2,615,738 | Johnson | Oct. 28, 1952 |